(12) United States Patent
Hirata et al.

(10) Patent No.: US 7,299,624 B2
(45) Date of Patent: Nov. 27, 2007

(54) EXHAUST GAS PURIFYING APPARATUS AND METHOD THEREOF

(75) Inventors: Hirohito Hirata, Suntou-gun (JP); Masaru Kakinohana, Susono (JP); Masaya Ibe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/372,268

(22) Filed: Mar. 10, 2006

(65) Prior Publication Data

US 2006/0225406 A1    Oct. 12, 2006

(30) Foreign Application Priority Data

Apr. 12, 2005    (JP)    .............................. 2005-114611

(51) Int. Cl.
*F01N 3/00* (2006.01)
(52) U.S. Cl. ............................ 60/275; 69/274; 69/285; 69/299
(58) Field of Classification Search .................. 60/275, 60/286, 301, 299, 303, 274, 285, 289, 300
See application file for complete search history.

(56) References Cited

U.S. PATENT DOCUMENTS 5,235,956 A * 8/1993 Yoshizaki .................. 123/585
5,461,857 A * 10/1995 Itou et al. ..................... 60/276
5,711,147 A * 1/1998 Vogtlin et al. ................ 60/274
5,746,984 A * 5/1998 Hoard ......................... 422/169
5,891,409 A * 4/1999 Hsiao et al. .............. 423/239.1
6,247,303 B1 * 6/2001 Broer et al. .................. 60/274

FOREIGN PATENT DOCUMENTS

JP    A 2000-282844    10/2000
JP    A 2002-263491    9/2002

* cited by examiner

*Primary Examiner*—Thomas Denion
*Assistant Examiner*—Diem Tran
(74) *Attorney, Agent, or Firm*—Oliff & Berridge, PLC

(57) ABSTRACT

An exhaust gas purifying apparatus provided in an exhaust passage connected with an engine includes an upstream catalyst that is provided in the exhaust passage, and that removes NOx; a downstream catalyst that is provided downstream of the upstream catalyst in the exhaust passage; and a supply device that supplies an oxygen-activating component to a portion of the exhaust passage located between the upstream catalyst and the downstream catalyst. In the exhaust gas purifying apparatus, the upstream catalyst removes NOx, and then an oxygen-activating component is supplied to the exhaust gas. Further, the downstream catalyst removes a hydrocarbon compound contained in the exhaust gas.

7 Claims, 3 Drawing Sheets

EXHAUST GAS PURIFYING APPARATUS AND METHOD THEREOF

INCORPORATION BY REFERENCE

The disclosure of Japanese Patent Application No. 2005-114611 filed on Apr. 12, 2005 including the specification, drawings and abstract is incorporated herein by reference in its entirety.

BACKGROUND OF THE INVENTION

1. Field of the Invention

The invention relates to an exhaust gas purifying apparatus that purifies exhaust gas discharged from an engine, and a method thereof.

2. Description of the Related Art

Exhaust gas discharged from an engine, which is mounted on a vehicle and the like, contains HC, CO, and NOx. A three-way catalyst, a NOx storage reduction (NSR) catalyst or the like is provided in an exhaust passage in order to remove these substances.

For example, Japanese Patent Application Publication No. JP-A-2000-282844 describes a method for purifying exhaust gas containing hydrocarbon compounds, which mainly consist of methane. In the method, ozone is generated and supplied into high-temperature exhaust gas, whereby the hydrocarbon compounds are removed from exhaust gas.

As described above, for example, ozone is used to remove the hydrocarbon compounds. However, for example, when the ozone is supplied directly into exhaust gas discharged from the engine to remove these hydrocarbon compounds as described in the above publication, NOx and the like contained in exhaust gas may be oxidized by the ozone that has strong oxidizability. That is, an oxidation reaction may occur. In such a case, ozone is not appropriately used in removing the hydrocarbon compounds. Further, because NOx should be removed by a reduction reaction using a three-way catalyst or the like, the oxidation reaction, which is reverse of the reduction reaction, may make it difficult to remove NOx.

SUMMARY OF THE INVENTION

It is an object of the invention to provide an exhaust gas purifying apparatus that effectively removes NOx and other substances, without causing difficulty in removing NOx, and a method thereof.

A first aspect of the invention relates to an exhaust gas purifying apparatus that is provided in an exhaust passage connected with an engine. The apparatus is provided in the exhaust passage, and includes an upstream catalyst, a downstream catalyst, and a supply device. The upstream catalyst is provided in the exhaust passage and removes NOx. The downstream catalyst is provided downstream of the upstream catalyst in the exhaust passage. The supply device supplies an oxygen-activating component to a portion of the exhaust passage located between the upstream catalyst and the downstream catalyst.

In the above-mentioned aspect, the upstream catalyst removes NOx contained in exhaust gas. Then, the oxygen-activating component is supplied to the exhaust gas whose NOx content is decreased, so that an oxidation reaction is promoted. In this manner, the upstream catalyst removes NOx and the like, and the downstream catalyst removes substances other than NOx. With the configuration, NOx and other substances can be effectively removed, without causing difficulty in removing NOx.

A second aspect of the invention relates to an exhaust gas purifying method of purifying exhaust gas discharged from an engine through an exhaust passage. The method includes removing NOx contained in exhaust gas using an upstream catalyst that is provided in the exhaust passage, and that removes NOx; supplying an oxygen-activating component to a portion of the exhaust passage located downstream of the upstream catalyst; and removing a hydrocarbon compound contained in the exhaust gas using a downstream catalyst that is provided downstream of the portion of the exhaust passage.

In the above-mentioned aspect, first, the upstream catalyst removes NOx contained in exhaust gas. The oxygen-activating component is supplied to the exhaust gas whose NOx content is decreased and which contains the hydrocarbon compounds, so that an oxidation reaction is promoted. In this manner, the upstream catalyst removes NOx and the like, and the downstream catalyst removes the hydrocarbon compounds. In other words, NOx and the hydrocarbon compounds are effectively removed, without causing difficulty in removing NOx.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED BODIMENTS

Figure 1:
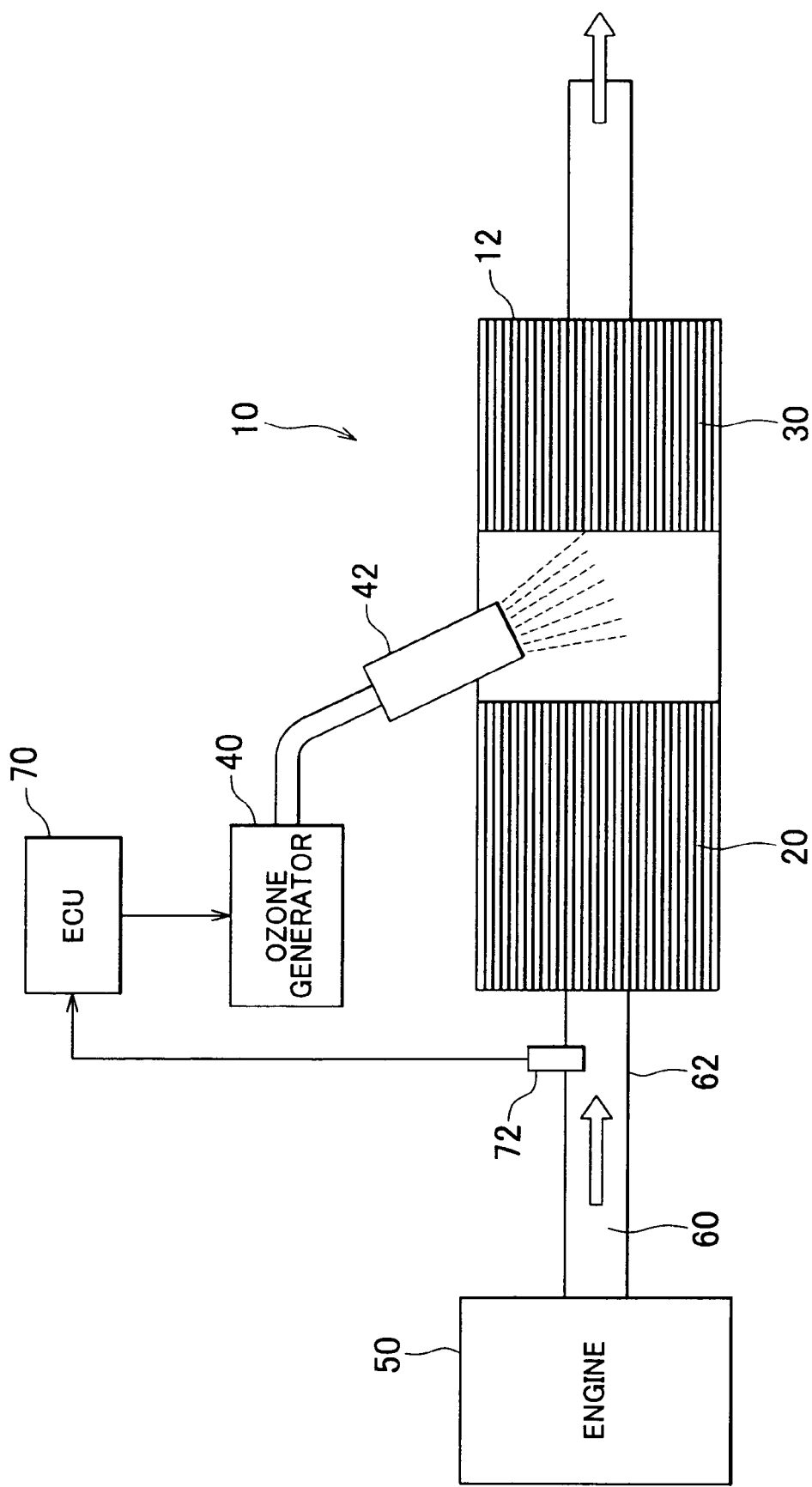
FIG. 1 illustrates a schematic view of an exhaust gas purifying apparatus according to an embodiment of the invention.

FIG. 1 is a schematic diagram showing an exhaust system of a vehicle to which an exhaust purifying apparatus 10 in an embodiment according to the invention is applied. The engine 50 is mounted with the vehicle. The exhaust gas purifying apparatus 10 is disposed in the exhaust system of the engine 50, that is, in an exhaust passage 60 located downstream of an exhaust port (not shown) of the engine 50. The exhaust passage 60 is defined by an exhaust pipe 62. The engine 50 in the embodiment is a gasoline engine, and exhaust gas discharged from the engine 50 contains NOx and hydrocarbon compounds, such as methane.

The exhaust gas purifying apparatus 10 in the embodiment includes a case (catalytic converter) 12 made of metal. A first catalyst 20 and a second catalyst 30 are apart from each other in the case 12. The first catalyst 20 is disposed upstream of the second catalyst 30 in the exhaust passage 60. Because the first catalyst 20 and the second catalyst 30 are disposed in this manner, the first catalyst 20 may be referred to as the upstream catalyst, and the second catalyst 30 may be referred to as the downstream catalyst. An ozone generator 40 that supplies ozone ($O_3$) as an oxygen activating component is connected at a location between the first catalyst 20 and the second catalyst 30, which are provided in the case 12. In FIG. 1, a discharge nozzle 42, which is a part of the ozone generator 40 and located at one end portion thereof, is connected to the case 12.

The first catalyst 20, which is a three-way catalyst, removes HC, CO, and NOx from exhaust gas discharged from the engine 50. With the first catalyst 20, for example, NOx contained in exhaust gas is reduced and changed into nitrogen ($N_2$) and oxygen ($O_2$). CO and HC are oxidized by the oxygen ($O_2$) and changed into carbon dioxide ($CO_2$) and water ($H_2O$), that is, vapor. Thus, the contents of HC, CO, and NOx in exhaust gas are decreased. More specifically, the first catalyst 20 is a platinum (Pt)-based catalyst that includes a honeycomb structural body. Cerium (Ce) is carried by the honeycomb structural body to improve the function of storing oxygen. As catalytic components, palladium (Pd), rhodium (Rh), copper (Cu), manganese (Mn) and the like may be used instead of using platinum (Pt) and cerium (Ce). It is preferable that the first catalyst 20 removes HC, CO, and NOx. However, the first catalyst 20 may be any catalyst that removes at least NOx. That is, the first catalyst 20 is not limited to the three-way catalyst, and may be a NOx storage reduction catalyst (NSR catalyst). Examples of the NSR catalyst include a Pt/Rh-based catalyst where barium (Ba) is carried to improve the function of storing NOx.

The second catalyst 30 is an oxidation catalyst. In the second catalyst 30, Pt is carried by the honeycomb structural body. The exhaust gas discharged from the first catalyst 20 contains the hydrocarbon compounds which remain unremoved by the first catalyst 20 due to low reactivity. Further, for example, when the exhaust gas is at a certain temperature and has a certain composition and the like, a methane-forming reaction is caused on the first catalyst 20. Methane generated by this reaction may be contained in exhaust gas discharged from the first catalyst 20. That is, exhaust gas, in which NOx is reduced and the hydrocarbon compounds are contained, is introduced to the second catalyst 30. The hydrocarbon compounds contained in the exhaust gas are caught and oxidized by the second catalyst 30, and changed into, for example, $CO_2$ and $H_2O$. Examples of the hydrocarbon compounds, which are removed by the second catalyst 30, include methane ($CH_4$), propylene ($C_3H_6$), unburned fuel and the like. In particular, $CH_4$ has low reactivity. Therefore $CH_4$ is difficult to remove using the first catalyst 20, in the embodiment, such as the three-way catalyst and the NSR catalyst. $CH_4$ is removed on the second catalyst 30. In order to promote removal of $CH_4$, the ozone generator 40 described below is provided in this embodiment.

As described above, the ozone generator 40 is provided so as to supply $O_3$ to the exhaust passage 60. However, with the ozone generator 40, not only $O_3$ but also air containing $O_3$ is supplied to the exhaust passage 60. More specifically, the ozone generator 40 includes a pump (not shown), a discharger (not shown), and a pulsed power supply (not shown), and is operated by a control output of a controller (ECU) 70 described later. In the ozone generator 40, air is taken into the discharger from outside by the pump, and corona discharge is generated between a pair of electrodes (not shown) in the discharger by supplying electric power from the pulsed power supply. The corona discharge acts on air in the discharger. This generates $O_3$, which is a kind of the oxygen-activating component. More specifically, an electron collides with an oxygen molecule ($O_2$) in the air such that an oxygen atom is generated, and $O_3$ is generated by combining the oxygen atom with the oxygen molecule. $O_3$ thus generated and air are discharged from the discharge nozzle 42 and supplied into the case 12, that is, into the exhaust passage 60, and flow to the second catalyst 30. In the ozone generator 40, the amounts of electric power and the like supplied to the discharger are controlled to appropriate values so as to generate $O_3$ while minimizing the amount of generated NOx. Instead of $O_3$, $O_2$ radicals, O radicals and the like may be supplied as the oxygen-activating component.

A temperature sensor 72 is provided in the exhaust pipe 62. The temperature of the exhaust passage 60 detected by the temperature sensor 72, that is, the temperature of exhaust gas, is input to the ECU 70. The temperature sensor 72 is provided in the exhaust pipe 62 at a position upstream of the first catalyst 20.

For example, the ECU 70 is composed of a microcomputer. The ECU 70 includes a CPU, a ROM, a RAM, an A/D converter, an input interface, an output interface and the like. The temperature sensor 72 is connected to the input interface via an electric wire. Then, the amount of ozone generated (supplied) by the ozone generator 40 in the embodiment is changed and adjusted by the control output from the ECU 70 based on the temperature of the exhaust passage 60 detected by the temperature sensor 72. More specifically, the control output changes the amount of electric power supplied to the discharger from the pulsed power supply in the ozone generator 40, thereby changing the amount of supplied ozone among three levels of "0", "sp1", and "sp2" (0<sp1<sp2) as described later.

Because the exhaust gas purifying apparatus according to the embodiment has the aforementioned configuration, first, exhaust gas discharged from the engine 50 flows into the first catalyst 20 through the exhaust passage 60, and mainly HC, CO, and NOx are removed from the exhaust gas flowing in the first catalyst 20 (first step). The ozone generator 40 supplies $O_3$ (ozone) to a portion of the exhaust passage 60 located downstream of the first catalyst 20 and upstream of the second catalyst 30 (second step). By performing these steps, the exhaust gas containing the hydrocarbon compounds, such as $CH_4$, which are not removed by the first catalyst 20, flows into the second catalyst 30. Also, the proportion of the oxygen-activating component contained in exhaust gas flowing into the second catalyst 30 is increased, and the air-fuel ratio of the exhaust gas introduced to the second catalyst 30 becomes close to lean. As a result, substances other than NOx, that are, the hydrocarbon compounds such as $CH_4$, are oxidized by the second catalyst 30. For example, $CH_4$ is oxidized to form $H_2O$ and $CO_2$. Thus, the hydrocarbon compounds contained in exhaust gas are removed (third step).

Figure 2:
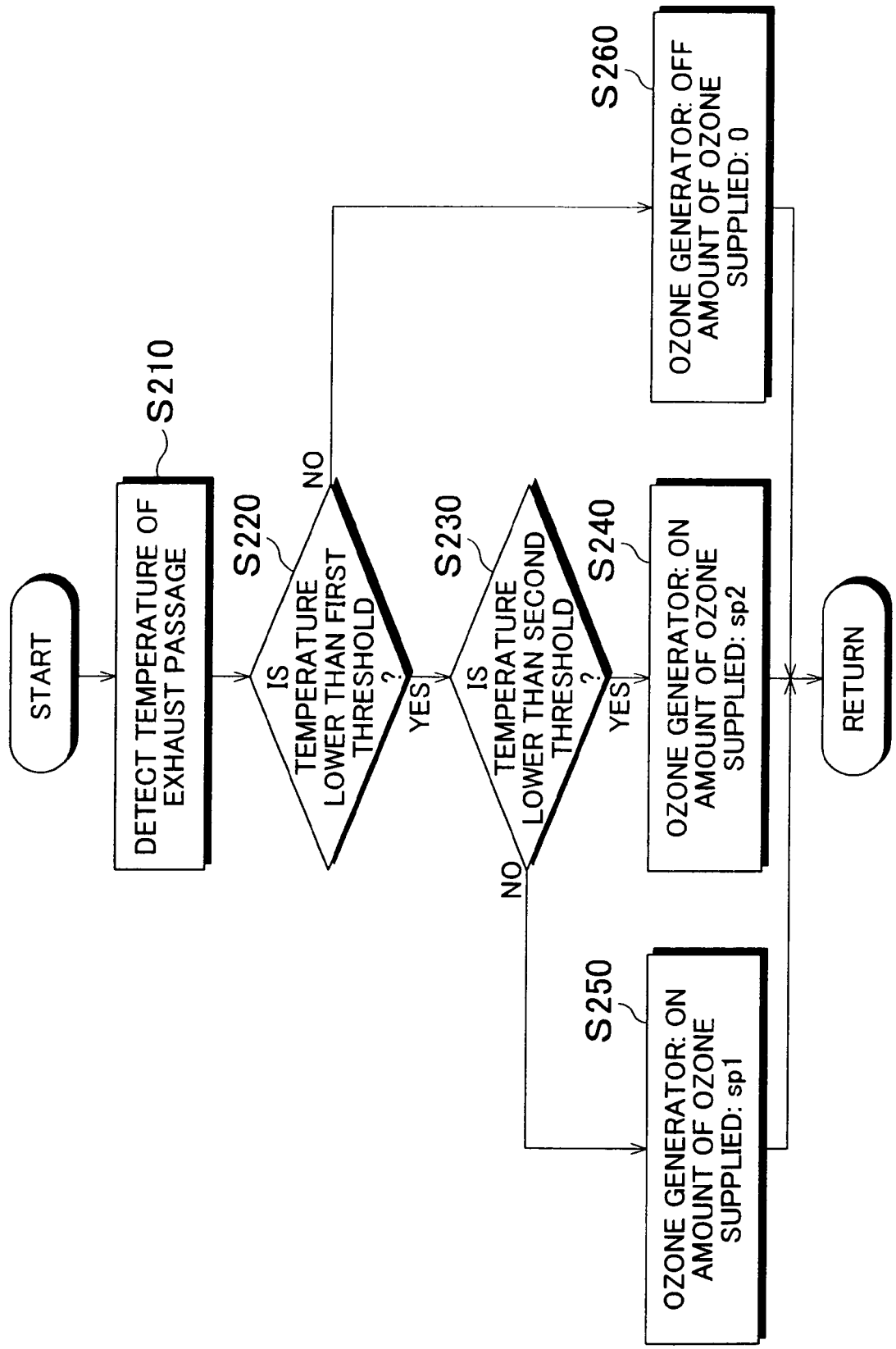
FIG. 2 illustrates a control flow chart according to an embodiment of the invention.

A control of the ECU 70 that changes the amount of generated (supplied) ozone among the three levels will be described with reference to FIG. 2. In FIG. 2, in step S210, the ECU 70 first detects the temperature of the exhaust passage 60 based on a signal output from the temperature sensor 72. In step S220, it is determined whether the detected temperature is in a predetermined temperature range. More specifically, it is determined whether the detected temperature is lower than a first threshold in step S220. The first threshold is 500° C. in the embodiment. The temperature is a boundary temperature between a temperature range in which the hydrocarbon compounds such as $CH_4$ are removed to some extent only by the second catalyst 30, and a temperature range in which the hydrocarbon compounds cannot be sufficiently removed only by the second catalyst 30, and therefore, the hydrocarbon compounds need to be removed by a synergistic effect of the second catalyst 30 and $O_3$. The first threshold is preliminarily obtained by an experiment and stored in the ROM of the ECU 70.

When it is determined that the temperature of the exhaust passage 60 is lower than the first threshold in step S220, the process proceeds to step S230. In step S230, it is determined whether the temperature (the temperature of the exhaust passage 60 detected in step S210) is lower than a second threshold. The second threshold is 400° C. in the embodiment. The temperature is a boundary temperature between a temperature range in which the hydrocarbon compounds such as $CH_4$ are more efficiently removed if $O_3$ is used in addition to the second catalyst 30, but the hydrocarbon compounds can be removed without using $O_3$, and a temperature range in which $O_3$ is necessary for removal of the hydrocarbon compounds. The second threshold is preliminarily obtained by an experiment and stored in the ROM of the ECU 70.

When it is determined that the temperature of the exhaust passage 60 is lower than the second threshold in step S230, the process proceeds to step S240. In step S240, the ECU 70 outputs the signal to the ozone generator 40 so that the ozone generator 40 generates a greater amount of $O_3$, that is, the amount of ozone supplied by the ozone generator 40 becomes sp2. As a result, the hydrocarbon compounds such as $CH_4$ are appropriately removed even at a temperature lower than 400° C.

When it is determined that the temperature of the exhaust passage 60 is equal to or higher than the second threshold in step S230, the process proceeds to step S250. In step S250, the ECU 70 outputs the signal to the ozone generator 40 so that the ozone generator 40 generates a smaller amount of $O_3$, that is, the amount of ozone supplied by the ozone generator 40 becomes sp1. As a result, the hydrocarbon compounds such as $CH_4$ are appropriately removed at a temperature equal to or higher than 400° C. and lower than 500° C. This also prevents excess $O_3$ from flowing to the downstream of the second catalyst 30.

When it is determined that the temperature of the exhaust passage 60 is equal to or higher than the first threshold in step 220, the process proceeds to step S260. In step S260, the supply of electric power from the pulsed power supply of the ozone generator 40 to the discharger is stopped, and supply of $O_3$ is to the exhaust passage 60 is stopped, that is, the amount of supplied ozone is set to "0".

The control above makes it possible to appropriately remove NOx and the hydrocarbon compounds. In the invention, the substances other than NOx are not limited to the hydrocarbon compounds, such as methane. For example, the substances other than NOx may include HC, CO and the like, which are removed more efficiently by oxidation.

In the aforementioned embodiment, the first catalyst 20 and the second catalyst 30 are placed in the same case 12. However, the first catalyst 20 and the second catalyst 30 may be separately placed in respective separate cases and disposed in the exhaust passage 60. Further, each of the first catalyst 20 and the second catalyst 30 may consist of one catalyst or a plurality of catalysts serially arranged. Any catalyst available to those skilled in the art can be employed as each of the catalysts in the invention. In particular, as the first catalyst 20, any catalyst that removes at least NOx may be used. As the second catalyst 30, any catalyst that promotes at least oxidation may be used. The same catalyst, for example, the three-way catalyst, may be used as the first catalyst 20 and the second catalyst 30.

The ozone generator 40 in the aforementioned embodiment is configured such that the discharge nozzle 42 at one end portion of the ozone generator 40 is inserted into the portion of the exhaust passage 60 located between the first catalyst 20 and the second catalyst 30. That is, the discharge nozzle 42 is connected to the portion of the exhaust passage 60. However, as long as the ozone generator 40 can supply the exhaust passage 60 with the oxygen activating component having strong oxidizability, such as $O_3$, the ozone generator 40 may be arranged in the exhaust passage 60, or may be arranged outside the exhaust passage 60 so that the ozone generator 40 supplies $O_3$ and the like to the exhaust passage 60 via other pipe. The supply means according to the invention includes means for supplying the exhaust passage 60 with oxygen as the oxygen-activating component.

In any case, the configuration and the like of the first catalyst 20, the second catalyst 30, and the ozone generator 40 may be determined comprehensively considering size, cost, power consumption and the like.

Further, in the embodiment, the amount of ozone generated by the ozone generator 40 is changed among three levels. The amount of generated ozone may be continuously adjusted based on the temperature of exhaust gas. In addition, the aforementioned control may be performed by estimating the temperature of exhaust gas based on the running state of the engine 50, which is obtained by detecting engine speed and engine load, and obtaining the temperature of the exhaust passage 60, that is, the first catalyst 20 and the second catalyst 30, based on the temperature of exhaust gas, the running time of the engine 50 and the like. Further, in the invention, a certain amount of the oxygen-activating component may be constantly supplied without limiting a timing of supply and the amount of supplied oxygen-activating component such as $O_3$.

As described above, a supply source of the oxygen-activating component in the invention may include a device that generates the oxygen-activating component by treating air, such as the discharger, and a device that generates the oxygen-activating component by treating the substances other than air. The supply source may also include a tank that stores the oxygen-activating component.

In the aforementioned embodiment, the invention is applied to a gasoline engine to purify exhaust gas. The invention may also be applied to exhaust systems of any spark ignition engine and any compression ignition engine. In the aforementioned embodiment, the invention is applied to an engine of a vehicle to purify exhaust gas. However, the invention may also be applied to ship and aircraft to purify exhaust gas.

Figure 3:
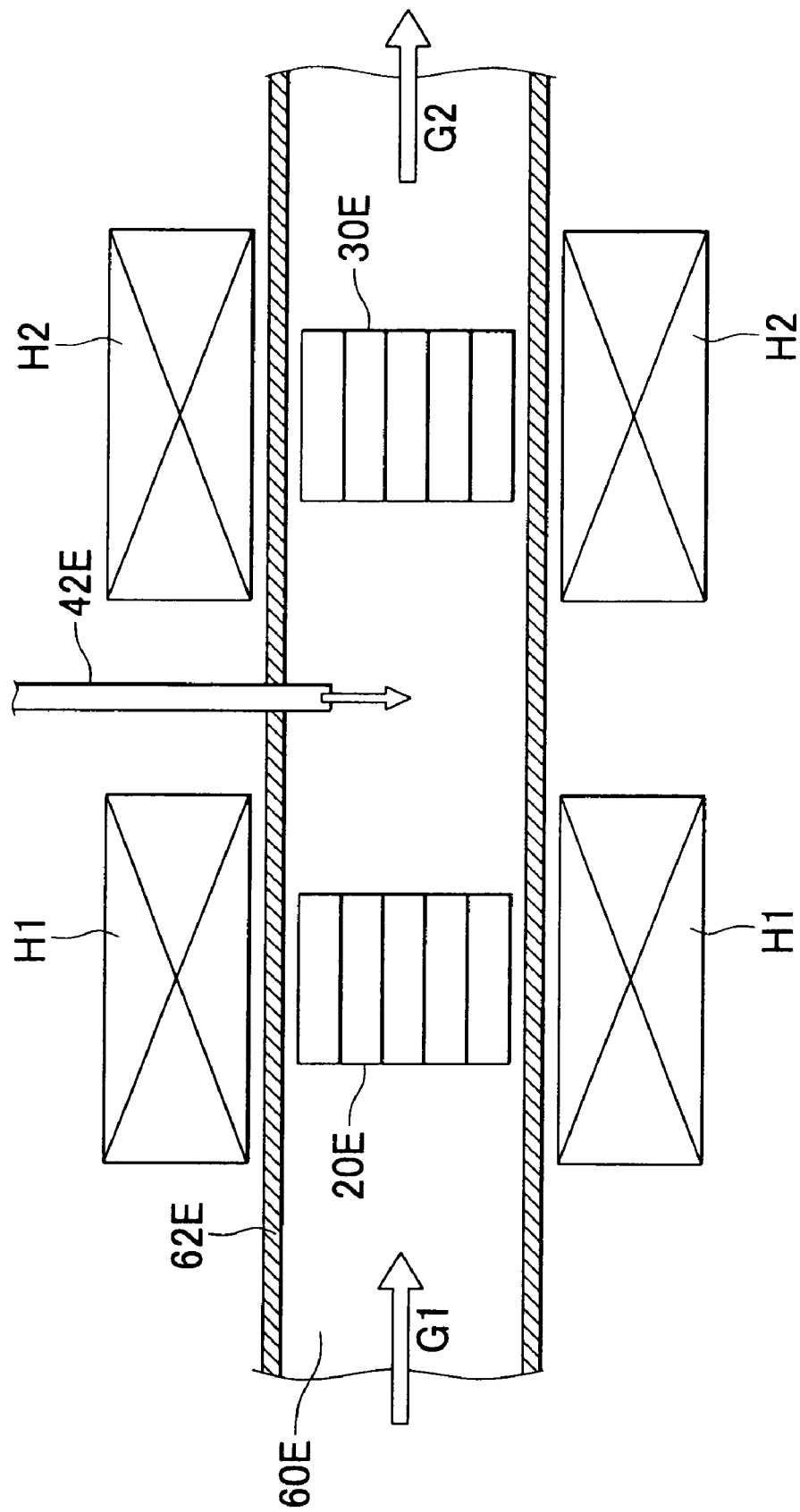
FIG. 3 illustrates a schematic view of an experimental apparatus.

In order to clarify how exhaust gas is purified in the embodiment, an experimental example will be herein described. FIG. 3 is a schematic view of an experimental device. In FIG. 3, members corresponding to the members in the aforementioned embodiment are denoted by the same reference numerals with "E". In an exhaust passage 60E defined by an exhaust pipe 62E, a first catalyst 20E and a second catalyst 30E are disposed apart from each other. The first catalyst 20E is placed on the upstream side. In a portion of the exhaust passage 60E located between the catalysts 20E and 30E, a discharge nozzle 42E connected with an ozone generator 40E (not shown) is disposed so that the discharge nozzle 42E supplies $O_3$ to the exhaust passage 60E.

As the first catalyst 20E, a honeycomb structural body made of cordierite (4 mil/400 cpsi) was used. The diameter of the honeycomb structural body was 30 mm and the length thereof was 25 mm. The honeycomb structural body was coated with solid solution of $Ce_{0.6}Zr_{0.4}O_2$ at the coating amount of 100 grams per liter (100 g/L), and baked for 2 hours at 500° C. after coating. The honeycomb structural body was treated with a dinitrodiammine platinum solution.

As a result, platinum (Pt) was carried by the honeycomb structural body such that the weight percentage of Pt with respect to the amount of $Ce_{0.6}Zr_{0.4}O_2$ becomes 1 wt %. As the second catalyst 30E, a honeycomb structural body made of cordierite (4 mil/400 cpsi) was used. The diameter of the honeycomb structural body is 30 mm and the length thereof is 25 mm. The honeycomb structural body was coated with $\gamma$-$Al_2O_3$ at the coating amount of 120 gram per liter (120 g/L), and baked for 2 hours at 500° C. after coating. The honeycomb structural body was treated with the diamminedinitro platinum solution. As a result, Pt was carried by the honeycomb structural body such that the weight percentage of Pt with respect to the amount of $\gamma$-$Al_2O_3$ becomes 1 wt %.

An experiment was conducted in each of the case where the discharge nozzle 42E supplies the exhaust passage 60E with dry air only at the flow rate of 200 cc per minute, and the case where the discharge nozzle 42E supplies the exhaust passage 60E with dry air containing 1000 ppm of $O_3$ at the same flow rate.

An infrared heater H1 surrounds a portion of the exhaust pipe 62E that surrounds the first catalyst 20E in order to establish an environment similar to the environment in the actual exhaust passage. Also, an infrared heater H2 surrounds another portion of the exhaust pipe 62E that surrounds the second catalyst 30E. With these heaters, the temperature of the first catalyst 20E and the second catalyst 30E is maintained at around 300° C. The experiment was conducted at this temperature.

Instead of exhaust gas, simulated gas G1 is supplied to the exhaust passage 60E at the flow rate of 10 liters per minute (10 L/min). As the simulated gas G1, gas containing the following components was used: 2000 ppm of CO, 1000 ppm of NO, 1800 ppmC of $C_3H_6$, 200 ppm of $CH_4$, 0.35% of $O_2$, 10% of $CO_2$, 3% of $H_2O$. The rest of the gas was $N_2$. The gas contains a larger amount of methane, compared to exhaust gas discharged from the actual engine, in light of detection accuracy of an analyzer.

In the above configuration, the simulated gas G1 was supplied to the exhaust passage 60E from the upstream side of the first catalyst 20E. Then simulated gas G2 flowing out from the downstream side of the second catalyst 30E was introduced to the analyzer (not shown) and analyzed to measure a removal rate (unit: %) that is the rate of removing NOx, CO, $C_3H_6$, and $CH_4$. The results are shown in TABLE 1. The values in TABLE 1 for each of NOx, CO, $C_3H_6$, and $CH_4$ are obtained by calculation using the formula (1) below.

TABLE 1

| | Removal rate (%) | |
|---|---|---|
| | Dry air only | Dry air + $O_3$ |
| NOx | 99 | 99 |
| CO | 100 | 100 |
| $C_3H_6$ | 98 | 100 |
| $CH_4$ | 55 | 100 |

Removal rate (%)=100–the amount of component in the simulated gas G2/the amount of component in the simulated gas G1×ϕ... (1)

According to TABLE 1, when only the dry air was supplied to the exhaust passage 60E, the rates of removing NOx, CO, and $C_3H_6$ are 98 to 100%. That is, NOx, Co, and $C_3H_6$ were almost completely removed. However, it is evident from TABLE 1 that only 55% (about half) of the amount of $CH_4$ was removed. Meanwhile, when the dry air containing $O_3$ was supplied to the exhaust passage 60E, NOx, CO, and $C_3H_6$ were almost completely removed, and $CH_4$ was completely removed. The results clearly indicate that NOx, CO, and $C_3H_6$ are removed by a catalyst at a certain temperature without using ozone, but, $CH_4$ is difficult to remove only by the catalyst. By supplying $O_3$, $CH_4$ is removed more effectively. $C_3H_6$ was not completely removed by the dry air only. However, by supplying $O_3$, $C_3H_6$ was completely removed (removal rate: 100%). The result indicates that supply of $O_3$ is also effective for removing the hydrocarbon compounds other than $CH_4$.

Also, it has become evident that removal of NOx is not inhibited by supplying $O_3$ into the exhaust passage 60E, that is, into exhaust gas because the first catalyst 20E removes NOx and the like before using the second catalyst 30E and $O_3$ that is the oxygen-activating component. Further, after NOx and the like are removed, the oxygen-activating component is supplied to exhaust gas. Therefore, the hydrocarbon compounds including $CH_4$ are effectively removed. This indicates that NOx and the hydrocarbon compounds are effectively removed from exhaust gas according to the embodiment.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An exhaust gas purifying apparatus provided in an exhaust passage connected with an engine, comprising:
   an upstream catalyst, provided in the exhaust passage, that removes NOx, the upstream catalyst being a three-way catalyst;
   a downstream catalyst provided downstream of the upstream catalyst in the exhaust passage;
   a supply device that supplies an oxygen-activating component to a portion of the exhaust passage located between the upstream catalyst and the downstream catalyst;
   a temperature detection device that detects a temperature of the exhaust passage; and
   a control device that changes an amount of the oxygen activating component supplied by the supply device, based on a temperature detected by the temperature detection device, wherein:
   when the temperature detected by the temperature detection device is equal to or higher than a first predetermined temperature, the control device controls the supply device to stop supplying the oxygen-activating component,
   when the temperature detected by the temperature detection device is lower than the first predetermined temperature and equal to or higher than a second predetermined temperature, which is lower than the first predetermined temperature, the control device controls the supply device to supply the oxygen-activating component in a first predetermined amount, and
   when the temperature detected by the temperature detection device is lower than the second predetermined temperature, the control device controls the supply device to supply the oxygen-activating component in a second predetermined amount, which is larger than the first predetermined amount.

2. The exhaust gas purifying apparatus according to claim 1, wherein exhaust gas introduced to the downstream catalyst contains a hydrocarbon compound.

3. The exhaust gas purifying apparatus according to claim 1, wherein the supply apparatus supplies at least one of ozone, an $O_2$ radical, and an O radical to the exhaust passage.

4. The exhaust gas purifying device according to claim 1, further comprising:
   a determination device that determines whether the temperature detected by the temperature detection device is in a predetermined temperature range, wherein
   the control device controls the supply device to supply the oxygen-activating component when the determination device determines that the temperature is in the predetermined temperature range.

5. The exhaust gas purifying apparatus according to claim 1, further comprising a generator disposed remotely from the exhaust passage, wherein the supply device introduces an oxygen-activating component from the generator.

6. An exhaust gas purifying method of purifying exhaust gas discharged from an engine through an exhaust passage, comprising:
   detecting a temperature of the exhaust passage with a temperature detection device;
   removing NOx contained in exhaust gas using an upstream catalyst that is provided in the exhaust passage, and that removes NOx, the upstream catalyst being a three-way catalyst;
   supplying an oxygen-activating component to a portion of the exhaust passage located downstream of the upstream catalyst; and
   removing a hydrocarbon compound contained in exhaust gas using a downstream catalyst provided downstream of the portion of the exhaust passage;
   changing an amount of the oxygen activating component supplied by the supply device based on a temperature detected by the temperature detection device,
   stopping supply of the oxygen-activating component when the temperature detected by the temperature detection device is equal to or higher than a first predetermined temperature,
   supplying the oxygen-activating component in a first predetermined amount when the temperature detected by the temperature detection device is lower than the first predetermined temperature and equal to or higher than a second predetermined temperature, which is lower than the first predetermined temperature, and
   supplying the oxygen-activating component in a second predetermined amount, which is larger than the first predetermined amount, when the temperature detected by the temperature detection device is lower than the second predetermined temperature.

7. The exhaust gas purifying method according to claim 6, wherein the oxygen-activating component is supplied from a generator disposed remotely from the exhaust passage.

* * * * *